United States Patent
Bennett et al.

(10) Patent No.: US 8,149,735 B2
(45) Date of Patent: Apr. 3, 2012

(54) UTILIZING AD-HOC NETWORK PATHWAY SUPPORT VIA COMMUNICATION DEVICES

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 106 days.

(21) Appl. No.: 12/367,103

(22) Filed: Feb. 6, 2009

(65) Prior Publication Data

US 2010/0202320 A1    Aug. 12, 2010

(51) Int. Cl.
*H04W 4/00* (2009.01)
(52) U.S. Cl. ........................ 370/254; 370/338; 455/552.1
(58) Field of Classification Search .................... None
See application file for complete search history.

(56) References Cited

U.S. PATENT DOCUMENTS

| | | | | |
|---|---|---|---|---|
| 7,349,691 | B2* | 3/2008 | Karr et al. | 455/422.1 |
| 7,596,614 | B2* | 9/2009 | Saunderson et al. | 709/224 |
| 7,720,037 | B2* | 5/2010 | Bill | 370/338 |
| 2002/0058504 | A1* | 5/2002 | Stanforth | 455/426 |
| 2006/0250999 | A1* | 11/2006 | Zeng et al. | 370/312 |
| 2007/0258472 | A1* | 11/2007 | Eklund | 370/401 |
| 2008/0089298 | A1* | 4/2008 | Anschutz et al. | 370/338 |
| 2008/0227385 | A1* | 9/2008 | Bappu et al. | 455/3.06 |
| 2008/0301017 | A1* | 12/2008 | Dawson et al. | 705/35 |

* cited by examiner

*Primary Examiner* — Robert Scheibel
(74) *Attorney, Agent, or Firm* — Brinks Hofer Gilson & Lione

(57) ABSTRACT

A user end-point device may determine a plurality of personal communication devices that are operable to provide ad-hoc network pathway support when communicatively coupled to the user end-point device, and negotiate with the personal communication devices for incentives for facilitating ad-hoc network communication via one or more connections between the devices. Incentives comprise offering pay and/or credit to the personal communication devices. The personal communication devices receive traffic intended for the user end-point device, and the received traffic is stored, buffered, and/or queued in the personal communication devices. Various types of communication are available during ad-hoc network pathway support, comprising multicast and snoop communications. Providing access to, blocking, limiting and/or modifying available/offered services is managed based on incentives and/or availability of resources in the personal communication devices. The user end-point device is operable to reconstruct data from plurality of packets received directly and via the personal communication devices.

22 Claims, 5 Drawing Sheets

UTILIZING AD-HOC NETWORK PATHWAY SUPPORT VIA COMMUNICATION DEVICES

CROSS-REFERENCE TO RELATED APPLICATIONS/INCORPORATION BY REFERENCE

This application makes reference to:
U.S. application Ser. No. 12/327,265 filed on Dec. 3, 2008;
U.S. application Ser. No. 12/367,142 filed on even date herewith; and
U.S. application Ser. No. 12/327,295 filed on Dec. 3, 2008.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for utilizing ad-hoc network pathway support via communication devices.

BACKGROUND OF THE INVENTION

The growth of system connectivity has been one of the major developments in recent years. Fewer and fewer systems are operating as stand-alone boxes, and most of today's systems are increasingly becoming elements of complex networks. This growth in networking allows improved performance and increased flexibility. Various wired and/or wireless based communication standards have been developed to enable providing ever expanding system connectivity. The growth of system connectivity has also spurred a growth in applications that takes advantage of the benefits offered by the improved system connectivity, especially having access to entities that provided improved processing and/or storage capabilities.

Communication end-point devices, which comprise portable and/or stationary, may comprise a plurality of wireless technologies to enable use of various interfaces in transmitting and/or receiving data. For example, mobile devices, which may enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, and CDMA2000, LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN is based on standardized technologies; for example Class 2 Bluetooth (BT) technology.

While WPAN is very beneficial for certain applications, other applications may require larger service areas and/or capabilities. To satisfy such needs, other technologies have been developed to provide greater wireless service. Wireless local area networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Some WLAN systems are operated in conjunction with WPAN systems to provide users with an enhanced overall functionality. For example, Bluetooth technology is utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology may allow use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing ad-hoc network pathway support via communication devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing ad-hoc network pathway support via communication devices. In various embodiments of the invention, personal communication devices are operable to provide and/or utilize ad-hoc network pathway support. Accordingly, a user end-point device may determine a plurality of personal communication devices that are operable to provide ad-hoc network pathway support when communicatively coupled to the user end-point device. The user end-point device is operable to negotiate various incentives with the personal communication devices for facilitating ad-hoc network communication via one or more connections that are established between the user end-point device and the personal communication devices. The offering and/or requesting of services via ad-hoc network pathway support is incentivized to the servicing devices and/or to the serviced devices. The servicing and serviced devices are operable to negotiate parameters of services provided via ad-hoc network pathway support. The servicing devices are operable to request and/or receive pay and/or credit for providing ad-hoc network pathway support, and/or the serviced devices are operable to allow billing, debiting and/or payment form services received via ad-hoc network pathway support.

The ad-hoc network pathway support enables the serviced devices to utilize network connectivity via the servicing devices. Ad-hoc network pathway support is utilized where the serviced devices lack direct network connectivity and/or where network connectivity via servicing devices offers better network access performance. Various types of communication are available via ad-hoc network pathway support. Exemplary types of communication may comprise multicasting and snooping communications. During multicast communication, data and/or traffic intended for serviced devices is also communicated to servicing devices. During snoop communications, the serviced devices may snoop the servicing devices for any intended data and/or traffic. Because serviced devices are not generally required to process traffic and/or data received on behalf of serviced devices, beyond minimal addressing and/or routing related processing, communication between servicing and serviced devices during ad-hoc network pathway support may not required additional and/or specific securing.

Servicing operations via ad-hoc network pathway support is handled and/or managed by network service providers, via group support servers for example. The group support servers enable managing, for example, user accounts corresponding to servicing and/or serviced devices, network accessibility provided via ad-hoc network pathway support, and/or management of crediting/billing operations based on servicing operations provided via ad-hoc network pathway support.

Figure 1:
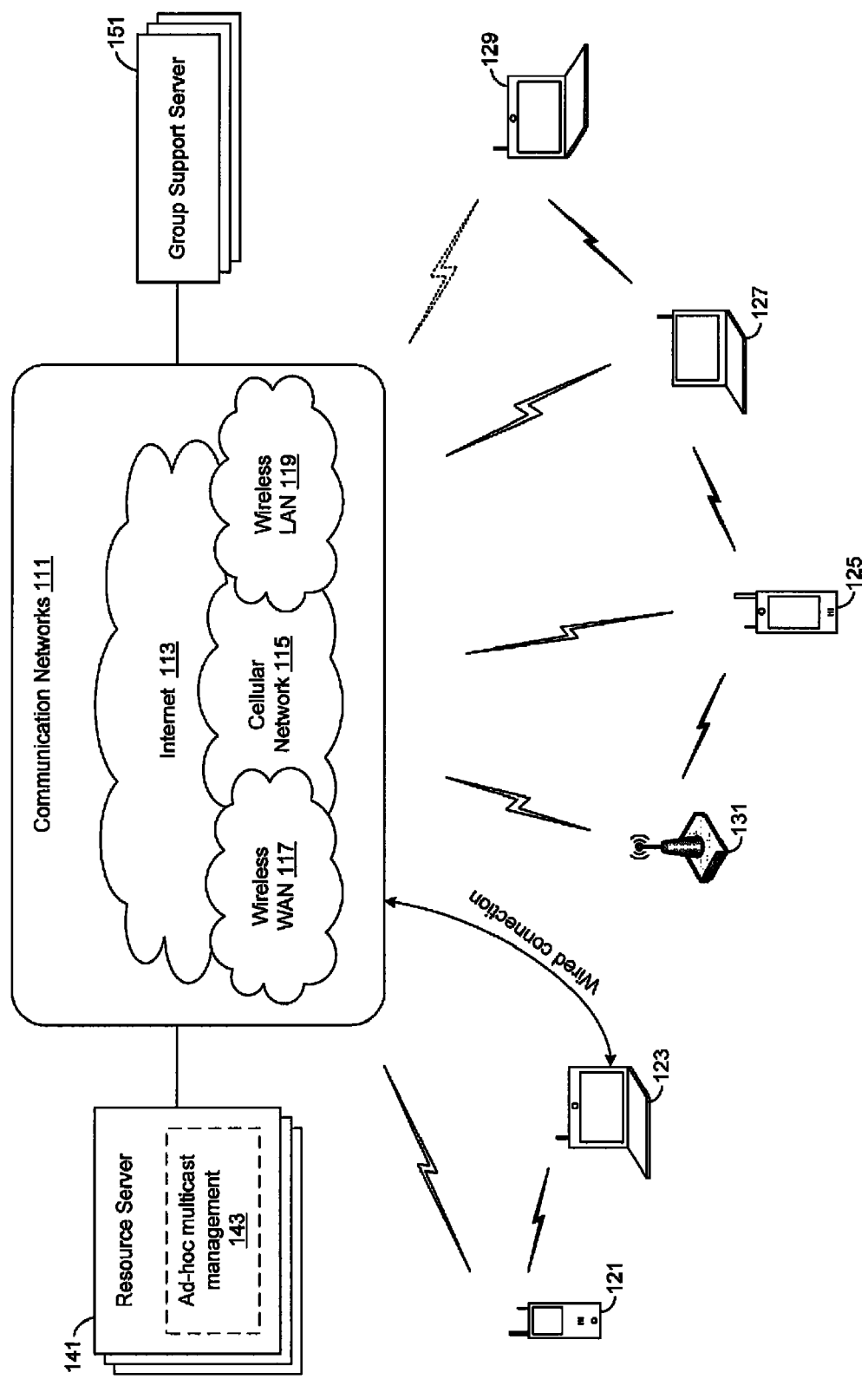
FIG. 1 is a block diagram that illustrates an exemplary setup of a plurality of end-point devices that are operable to enable ad-hoc network pathway support, in accordance with an embodiment of the invention.

FIG. 1 is a block diagram that illustrates an exemplary setup of a plurality of end-point devices that are operable to enable ad-hoc network pathway support, in accordance with an embodiment of the invention. Referring to FIG. 1, there is shown a plurality of communication networks 111, a cellular network 113, Internet 115, wireless wide area network (WWAN) 117, a wireless local area network (WLAN) 119, user end-point devices 121, 123, 125, 127, and 129, an access point (AP) servicing device 131, one or one or more resource server 141, and one or more group support servers 151.

The plurality of communication networks 111 comprises one or more networks that are operable to enable wireless and/or wired based connectivity to and/or between a plurality of local and/or remote entities based on one or more communication standards and/or protocols. The plurality of communication networks 111 comprises, for example, the cellular network 113, the Internet 115, the WWAN 117, and/or the WLAN 119. The cellular network 113 comprises suitable logic, circuitry and/or code that may enable communication via one or more cellular technologies. Exemplary cellular technologies comprise CDMA, WCDMA, CDMA1000, HSDPA, GSM, GPRS, EDGE, and/or UMTS. The cellular network 113 comprise, for example, a plurality of control and/or switching nodes, and a plurality of base stations that enable transmission and/or reception of cellular based communications between the cellular network 113 and cellular capable devices. The Internet 115 comprises a system of interconnected networks to enable exchange of data between a plurality of nodes, based on one or more networking standards, including, for example, the internet protocol (IP). For example, the Internet 115 enables connectivity among a plurality of private and public, academic, business, and/or government nodes and networks, wherein the physical connectivity is provided via the Public Switched Telephone Network (PSTN), via copper wires, fiber-optic cables, wireless interface, and/or other standards-based interfaces, and transport functionality is performed based on one or more protocols, including, for example, the TCP/IP protocol. The WWAN 117 comprises suitable logic, circuitry and/or code that enable implementation of one or more wireless wide network area standards and/or protocols. Exemplary wireless wide network area technologies may comprise, for example, WiMAX based networks. The WLAN 119 comprises suitable logic, circuitry and/or code that enable implementation of one or more wireless local network area standards and/or protocols. Exemplary wireless local network area technologies may comprise, for example, 802.11 based standards, including, for example, WiFi based networks.

Each of the user end-point devices 121, 123, 125, 127, and 129 comprises a personal end-point device and/or system operable to enable performing tasks and/or applications requested via devices' users. Additionally, the user end-point devices 121, 123, 125, 127, and 129 are operable to communicate via wireless and/or wired connections. Exemplary devices comprise PDAs, Smart phones, laptops and/or PCs that are operable to utilize, for example, one or more wired and/or wireless communication interfaces. Exemplary wireless and/or wired interfaces comprise, for example, WiFi, Bluetooth and/or other personal area network (WPAN) based interfaces, USB, wireless USB, and/or proprietary inter-device standards based interfaces. In an exemplary aspect of the invention, the user end-point devices 121, 123, 125, 127, and 129 are operable to establish device-to-device connections to request and/or provide ad-hoc network pathway support wherein a servicing device is utilized to enable the serviced device to receive data and/or messaging necessary to enable performing one or more operations in the serviced device. The private AP servicing device 131 is a privately owned and/or operated communication device that is operable to establish and/or service of a private access point network. The servicing device 131 comprises suitable logic, circuitry and/or code that enable performing network setup, management, and/or control operations. Additionally, and to facilitate providing network accessibility servicing via private AP networks, the servicing device 131 is operable to enable network connectivity to one or more of the communication networks 111, via one or more wireless and/or wired interfaces. For example, each the servicing devices 121, 123, and 125 is operable to utilize cellular links, Ethernet links, WiMAX links, and/or 802.11 links to enable establishing network connectivity via cellular network 113, the Internet 115, the WWAN 117, and/or the WLAN 119. In an exemplary aspect of the invention, the private AP servicing device 131 is operable to provide ad-hoc network pathway support to one or more user end-point devices that are communicatively coupled to the AP servicing device via one or more wireless and/or wired interfaces.

The resource server 141 comprises suitable logic, circuitry and/or code operable to support operations provided via user end-point devices. The resource server 141 is located local to or remote from the serviced devices, and/or may be dedicated to specific one or more user end-point devices. The resource server 141 comprises, for example, a device and/or system operable to provide data, messaging, and/or functionality that are utilized, for example, to enable performing operations in user end-point devices. The resource server 141 may comprise, for example, a server with improved processing subsystems and/or increased memory space, which is utilized to store and/or retrieve media streams that are offered via user end-point devices. In an exemplary aspect of the invention, the resource server 141 comprises an ad-hoc multicast management 143.

The ad-hoc multicast management 143 comprises suitable logic, circuitry and/or code that enable setup, control, and/or management of multicast communication during ad-hoc network pathway support. The ad-hoc multicast management 143 is utilized, for example, to enable communication of data and/or messaging, which is intended for user end-point device, to service devices in addition to the intended user end-point device.

The group support server 151 comprises suitable logic, circuitry, and/or code that enable providing and/or managing network accessibility during ad-hoc network pathway support. The group support server 151 is utilized, for example, by service providers to enable providing access to one or more of the plurality of communication networks 111 to a plurality of users. The group support server 151 is also operable, for example, to enable managing users accounts, network access, and/or grouping parameters corresponding to users of any of the devices 121, 123, 125, 127, 129 and/or 131.

In operation, each of the user end-point devices 121, 123, 125, 127 and 129 is operable to seek and/or obtain network connectivity via one or more wireless and/or wired connection to the plurality of communication networks 111. For example, the end point-device 121 may utilize a WiMAX connection to obtain network connectivity via the WWAN 117; the user end-point device 123 may utilize a wired Ethernet connection directly via the Internet 113; the end point-device 125 may utilize a cellular connection via the cellular network 115; and the user end-point devices 127 and 129 may utilize 802.11 connections via the WLAN 119. Obtained network connectivity enables, for example, performing operations that is requested in the user end-point devices by device users. For example, the user end-point devices may be utilized to request, receive, and/or playback media streams broadcasted by one or more head-ends.

In an exemplary aspect of the invention, at least some of the user end-point devices 121, 123, 125, 127 and/or 129 are operable to provide and/or request ad-hoc network pathway support during operations in the devices. The ad-hoc network pathway support enables a user end-point device to obtain network access via nearby devices, wherein the network connectivity via the servicing devices is utilized instead of and/or in addition to the network connection(s) obtained directly via the requesting user end-point device. The use of ad-hoc network pathway support is sought, for example, where the requesting device lacks direct network connectivity and/or where network connectivity via servicing devices offers better network access performance. For example, in instances where the user end-point device 123 has network connectivity via wired connection, the user end-point device 121, which may utilize a WiMAX connection, may request ad-hoc network pathway support via the user end-point device 123. Use of network connectivity via the user end-point 123 is more favorable, for example, because the network connectivity of the user end-point device 123 may be more reliable and robust and/or when the wireless connectivity of the user end-point device 121 is degraded due to, for example, interference and/or spatial separation from nearest appropriate access point. The user end-point device 129 may seek network connectivity via the user end-point device 127, however, because it lacks direct network connectivity of its own because it is, for example, out of range of the nearest 802.11 access point and/or lacks access credentials.

In addition to user end-point devices, other types of personal communicative devices are also operable to provide ad-hoc network pathway support. For example, the private AP servicing device 131 is operable to establish a private AP network that services user end-point devices present within operational proximity of the private AP servicing device 131. The private AP servicing device 131 is connected to one or more of the plurality of the communication networks 111, via one or more wired and/or wireless links. The private AP servicing device 131 establishes network connectivity via, for example, a WiMAX wireless link, a cellular link, an 802.11 link, via Ethernet based wired connection, and/or fiber optical cables. Accordingly, the user end-point device 125 may obtain network connectivity via the private AP servicing device 131. For example, in instances where the user end-point device 125 lacks any direct network access to the plurality of communication networks 111, the user end-point device 125 may establishes, instead, a connection with the private AP servicing device 131, to gain network access, via the private AP servicing device 131 network connectivity. The connection between the user end-point device 125 and the private AP servicing device 131 is setup via wireless connection, over Bluetooth link for example, and/or via wired connection, via Ethernet crossover cable for example. Network connectivity for the private AP servicing device 131 may also be utilized when the user end-point device 125 has some network access of its own. For example, in instances where network connectivity for the user end-point device 125 is limited to cellular links, network access through the private AP servicing device 131, via WiMAX and/or Ethernet connections, for example, is deemed more desirable, due to exemplary factors comprising higher bandwidth, quality of service (QoS), and/or network performance.

Various types of communication are available via ad-hoc network pathway support. Exemplary types of communication may comprise multicasting and snooping communications. During multicasting communications, data and/or messaging sent to the serviced user end-point device is also communicated to servicing devices. For example, the user end-point device 125 may be receiving a media broadcast from the resource server 141 via one or more of the communication networks 111. In instances network connectivity of the user end-point device 125 is insufficient to ensure reliable and/or robust reception of the media broadcast, the user end-point device 125 is operable to obtain ad-hoc network pathway support via the user end-point device 127 and/or the private AP servicing device 131. The ad-hoc network pathway support may be setup to enable multicasting communication wherein traffic packets carrying the media broadcast to the user end-point device 125 are also communicated to the user end-point device 127 and/or the private AP servicing device 131.

To enable multicast communication, traffic network addressing is modified to allow communicating traffic packets to the serviced user end-point device and one or more of the servicing devices. For example, in instances where data is communicated to the serviced user end-point device via TCP packets, addressing and/or routing information in the headers is modified to enable reception of the same packets by all the appropriated serviced and servicing devices. To enable necessary addressing and/or routing of traffic during multicast communication, broadcast head-ends and/or one or more nodes utilized in forwarding network traffic are modified, for example, to support multicast communication in the network infrastructure. For example, the ad-hoc multicast management 143 in the resource server 141 is operable to enable the user end-point device 125 to specify one or more servicing devices, the user end-point device 127 and/or the private AP servicing device 131 for example, to which the traffic packet are also to be sent. Accordingly, the ad-hoc multicast management 143 is then operable to modify addressing, routing, and/or transport related information in the traffic packets to enable reception of the traffic packets by the user end-point device 125 and by the user end-point device 127 and/or the private AP servicing device 131.

During snooping communication, a serviced user end-point device snoop servicing devices to determine, and/or request data and/or messaging, communicated to the servicing devices, which are intended for and/or sought by the serviced user end-point device. The data and/or messaging are then communicated from the servicing devices to the serviced user end-point device. For example, in instances where the user end-point device 129 is incapable of obtaining direct network connectivity, the user end-point device 129 is operable to obtain ad-hoc network pathway support via the user end-point device 127. The ad-hoc network pathway support is setup to enable the user end-point device 129 to 'snoop' the user end-point device 127 to determine and/or to request communication of network traffic that is sought by the user end-point device 129. For example, the devices is operable to enable the user end-point device 127 to allow the user end-point device 129 to request and/or receive from the user end-point device 129 network packets that match specific addressing criteria, based on MAC addresses, for example. The devices may also be operable to communicate to enable the user end-point device 129 to setup its network interfaces subsystems to receive network traffic that is otherwise intended for the user end-point device 127 by specifying addressing criteria that the user end-point device 127 would have utilized if it had obtained direct network connectivity.

In an exemplary aspect of the invention, ad-hoc network pathway support is incentivized. In this regard, the servicing user end-point devices that request ad-hoc network pathway support is incentivize to the servicing devices, for example, by enabling them, and/or their users, to receive and/or claim compensation, pay and/or credit for provide private AP services. The credit received for provide ad-hoc network pathway support is utilized, for example, to compensate for costs otherwise charged by service provider when the servicing devices are utilized to access networks operated by the service providers. The user accounts corresponding to the user end-point devices utilizing the ad-hoc network pathway support are adjusted, for example, to bill and/or debit their users for services provided via the private AP networks. The group support server 151 is operable, for example, to manage accounts corresponding to the AP servicing device 123 and/or the communication devices 143 and/or 145. Accordingly, the AP servicing device 123 is operable to request credit and/or billing adjustments for servicing the communication devices 143 and/or 145, via the group support server 151. In instances where the group support server 151 does not directly manage the user account for either of the devices receiving and/or providing private AP services, the group support server 151 communicates directly with other operator support servers to facilitate exchange of required user related information, to enable performing necessary billing and/or crediting adjustments.

Alternatively, a centralized depository is utilized to enable indirect exchange of user related information by instances of the group support server 151. The servicing devices are operable, for example, to queue and/or buffer traffic intended for and/or requested by the serviced user end-point devices. In an exemplary aspect of the invention, queuing and/or buffering parameters are negotiated between the servicing devices and the serviced user end-point devices. For example, queuing window, buffer size limitations, and/or buffering duration are setup by the servicing devices, and/or modified based on incentives offered by the serviced user end-point devices.

The ad-hoc network pathway support is also incentivized to the requesting user end-point devices. For example, ad-hoc network pathway support is utilized when it enables network accessibility, improved bandwidth, improved reliability and/or desirable content, functionality and/or networking capabilities. In an exemplary aspect of the invention, the devices are operable to negotiate incentivized arrangements, to enhance servicing incentives with regard to the requesting user end-point devices, the servicing devices, and/or service providers. For example, in instances where user end-point device 127 is only offering 10% of its available network bandwidth for networking accessibility to other user end-point devices, the user end-point device 129 is operable to negotiate with the user end-point device 127 for allocation of 30% of the available bandwidth in exchange for larger credit and/or higher pay.

Figure 2:
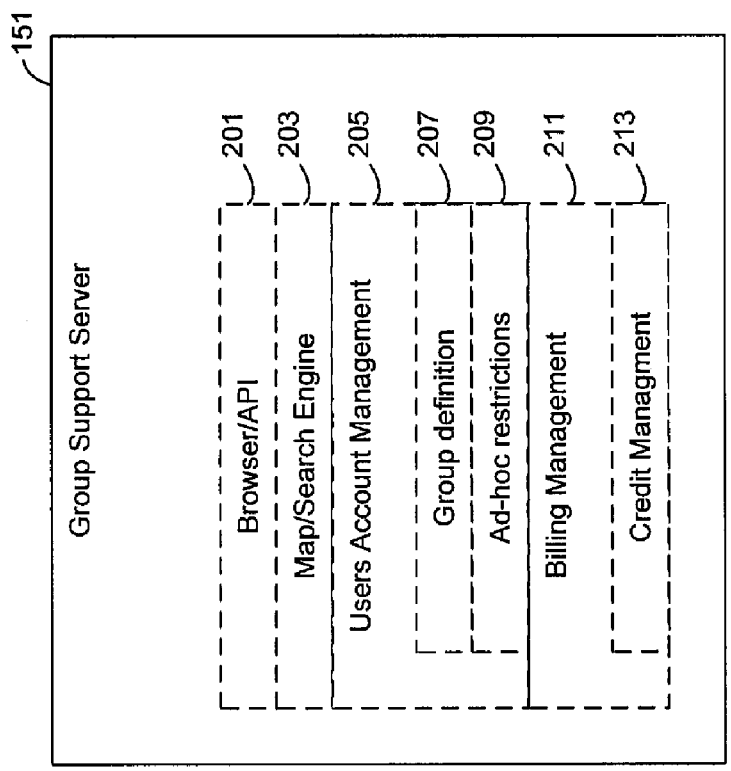
FIG. 2 is a block diagram that illustrates an exemplary group support server that enables ad-hoc network pathway support via end-point devices, in accordance with an embodiment of the invention.

FIG. 2 is a block diagram that illustrates an exemplary group support server that enables ad-hoc network pathway support via end-point devices, in accordance with an embodiment of the invention. Referring to FIG. 2A, there is shown the group support server 151, a browser/application programming interface (browser/API) entity 201, a map/search engine 203, a user account management 205, a group definition function 207, an ad-hoc restriction function 209, a billing management 211, and/or a credit management function 213.

The group support server 151 is substantially as described with respect to FIG. 1. In an exemplary embodiment of the invention, the group support server 151 comprises a plurality of constituent functional entities to enable supporting ad-hoc network pathway support. The group support server 151 comprises, for example, the browser/API entity 201, the map/search engine 203, the user account management 205, and/or the billing management 211.

The browser/API entity 201 comprises suitable logic and/or code operable to enable communication between the group support server 151 and other devices and/or systems. The browser/API entity 201 is operable, for example, to enable communication of messaging pertaining to support and/or management of ad-hoc network pathway support and/or to enable communications pertaining to user accounts, to request, for example, crediting and/or billing adjustments for one or more users serviced via the group support server 151. The browser/API entity 201 is operable to enable supporting messaging that is based on application programming interface (API) which is specific to a functionality running in the group support server 151 and is supported in devices communicating with the group support server 151. Alternatively, the browser/API entity 201 is operable to enable, for example, remote access and/or communication based on an HTTP based browsing interface. Accordingly, the browser/API entity 201 enables running an HTTP based server functionality via the group support server 151 that enable establishing peer-to-peer connection with HTTP based client functionality running in corresponding devices. In an exemplary aspect of the invention, the browser/API entity 201 is also operable to enable communication among a plurality of the group support server 151, directly and/or indirectly via centralized depositories for example, during exchange of user account information, for the purpose of performing crediting and/or billing operations.

The map/search engine 203 comprises suitable logic, circuitry and/or code that enable mapping specified locations to one or more devices supported and/or managed via the group support server 151. The group support server 151 is operable, for example, to receive requests for listing of devices that are operable to provide ad-hoc network pathway support based on a specified location. The map/search engine 203 is operable to enable determining and communication information pertaining to servicing devices based on the location of the requesting device. The determination of servicing devices that are reported back is based on a plurality of factors, comprising, for example, suitability to provide services based on operational proximity of the devices and/or other conditions including, for example, specified services and/or parameters of services.

The user account management 205 comprises suitable logic, circuitry and/or code that enable management of user related information. The user account management 205 is utilized, for example, to enable setting up, storing, maintaining and/or updating user network access related information. The user account management 205 enables, for example, creation and/or maintenance of user information that identifies and/or authenticates users seeking to access one or more communication networks managed via the group support server 151, directly and/or via ad-hoc network pathway support. The user account management 205 is operable, for example, to perform user authentication based on SIM challenge wherein the SIM based information provided by communication devices are compared to stored information. The user information comprises various types of information, including, for example, user identifiers, user passwords, and/or location and/or addressing related information for devices used by users managed and/or supported by the group support server 151. At least some of access information is provided directly by the group support server 151. To enable performing the various user account related operation, dedicated sub-entities are utilized within the user account management 205. For example, the address/location functionality 207 comprises functionality that enables creating, managing, and/or modifying users location related information. The group definition function 207 comprises suitable logic, circuitry and/or code operable to enable, for example, managing device grouping operations.

In an exemplary aspect of the invention, a plurality of devices is grouped wherein each device in the group provides and/or requests ad-hoc network pathway support exclusively and/or preferably via other devices in the group. Accordingly the group definition function 207 is operable to setup, control, and/or manage grouping information pertaining to specific device users, defined and/or managed via the user account management 205. The ad-hoc restriction management function 209 comprises functionality that enables creating, managing, and/or modifying ad-hoc restriction information. In an exemplary aspect of the invention, ad-hoc network pathway support provided and/or requested via specific devices is restricted based on a plurality of factors. For example, the ad-hoc network pathway support is adjusted variably based on the group definitions of the requesting and/or the servicing devices. Accordingly the ad-hoc restrictions function 209 is operable to setup, control, and/or manage ad-hock restriction information pertaining to specific device users, defined and/or managed via the user account management 205.

The billing management function 211 comprises suitable logic, circuitry and/or code that enable management of billing information via the group support server 151. For example, the billing management 211 comprises functionality that enables setting up, storing, maintaining and/or updating users' billing information as it pertains to network accessibility provided via one or more devices that are supported and/or managed via the group support server 151. In an exemplary aspect of the invention, the billing management 211 is operable to enable performing billing functionality related to ad-hoc network pathway support. For example, the billing management 211 is operable to enable billing user accounts corresponding to one or more of the user end-point devices 121, 123, 125, 127, and/or 129 when requesting and/or receiving ad-hoc network pathway support. The credit management 213 comprises functionality that is operable to perform crediting functions related to ad-hoc network pathway support. For example, the credit management 213 is operable to enable crediting users' accounts corresponding to one or more of the user end-point devices 121, 123, 125, 127, and/or 129, and/or the private AP servicing device 131, when providing ad-hoc network pathway support. The ad-hoc network pathway support based billing and/or crediting operations are performed via the billing management 211 and/or the credit management 213 based on messaging between the group support server 151 and the requesting and/or servicing devices, and/or based on messaging among a plurality of instances of the group support server 151, substantially as described with regard to, for example, FIG. 1.

In operation, the browser/API entity 201, the map/search engine 203, the user account management 205, the group definition function 207, the ad-hoc restriction function 209, the billing management 211, and/or the credit management function 213 are utilized to enable use of the group support server 151 to manage and/or support ad-hoc network pathway support. For example, the browser/API entity 201 is utilized to enable servicing devices and/or requesting devices to communicate with the group support server 151. The map/search engine 203 is utilized to provide mapping functionality that enables, for example, requesting devices to locate nearby servicing devices. The user account management 205, the group definition function 207, the ad-hoc restriction function 209 are utilized to manage users accounts, enabling user identification and/or authentication, and/or to perform ad-hoc network pathway support grouping and/or restriction related operations. The billing management 211 and/or the credit management function 213 are utilized to enable performing billing and/or crediting operations to billing requesting devices and/or to credit and/or pay servicing devices for services received and/or provided via ad-hoc network pathway support.

Figure 3A:
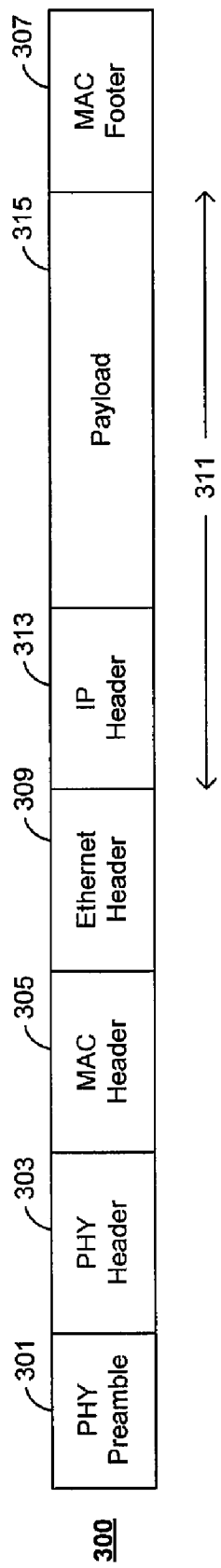
FIG. 3A is a block diagram that illustrates an exemplary 802.11 packet structure, which enables ad-hoc network pathway support, in accordance with an embodiment of the invention.

FIG. 3A is a block diagram that illustrates an exemplary 802.11 packet structure, which enables ad-hoc network pathway support, in accordance with an embodiment of the invention. Referring to FIG. 3A, there is shown an exemplary 802.11 packet 300.

The 802.11 packet 300 comprises, for example, a physical layer (PHY) preamble, a PHY header 303, a media access control (MAC) header 305, a MAC footer 307, an Ethernet header 309, a traffic frame 309, an Internet Protocol (IP) header 313, and a payload 315. The 802.11 packet 300 overall size is set, for example, by protocol specifications for example. Consequently, the amount of data that is carried via 802.11 packets is limited by the maximum size of the packet and the size of headers that are utilized to enable 802.11 communication between the devices and/or any other headers that are necessary to facilitate transport of network traffic.

The PHY preamble 301 comprises a plurality of bits and/or bytes that are utilized to enables receiving devices, for example, to synchronize to the incoming 802.11 signals properly. The PHY header 303 comprises a plurality of bits and/or bytes that are utilized to enable receiving device to perform necessary PHY layer processing operations based on the 802.11 protocol. The PHY header 303 comprises, for example, information about the frame carried via the 802.11, including, for example, size information and/or service related information. Each of the MAC header 305 and the MAC footer 313 comprises a plurality of bits and/or bytes that are utilized to enable receiving devices to perform necessary MAC layer processing operations. The MAC header 305 comprises, for example, addressing information, QoS related information and/or size information. The MAC footer 313 comprises information that enables, for example, error detection and/or correction operations. The various MAC and/or PHY fields enable encapsulating network packets that are then communicated via 802.11 links. The Ethernet header 309 comprises information that enable, for example, identifying the network frame 311 carried via the 802.11 packet 300. Exemplary network frames comprise, for example, IP frames. Where the network frame 311 comprises an IP frame, it comprises, for example, the IP header 313 and the payload 315. The IP header 313 comprises a plurality of bit and/or bytes that enable encapsulating the payload 315 in a, for example, IPv4 datagram. The payload 315 comprises data bits, padding bits, and/or any additional headers and/or footers. For example, where network traffic is communicated via TCP frames, the payload 315 comprises, in addition to data, TCP headers.

In operation, the 803.11 packet 300 is utilized to enable a plurality of devices to communicate via 802.11 connections. In an exemplary aspect of the invention, the 802.11 packet 300 is utilized to communicate via 802.11 connections between servicing devices and a service user end-point device. The 802.11 packet 300 is thus utilized to enable carrying network traffic intended for and/or sought by the serviced user end-point device.

Figure 3B:
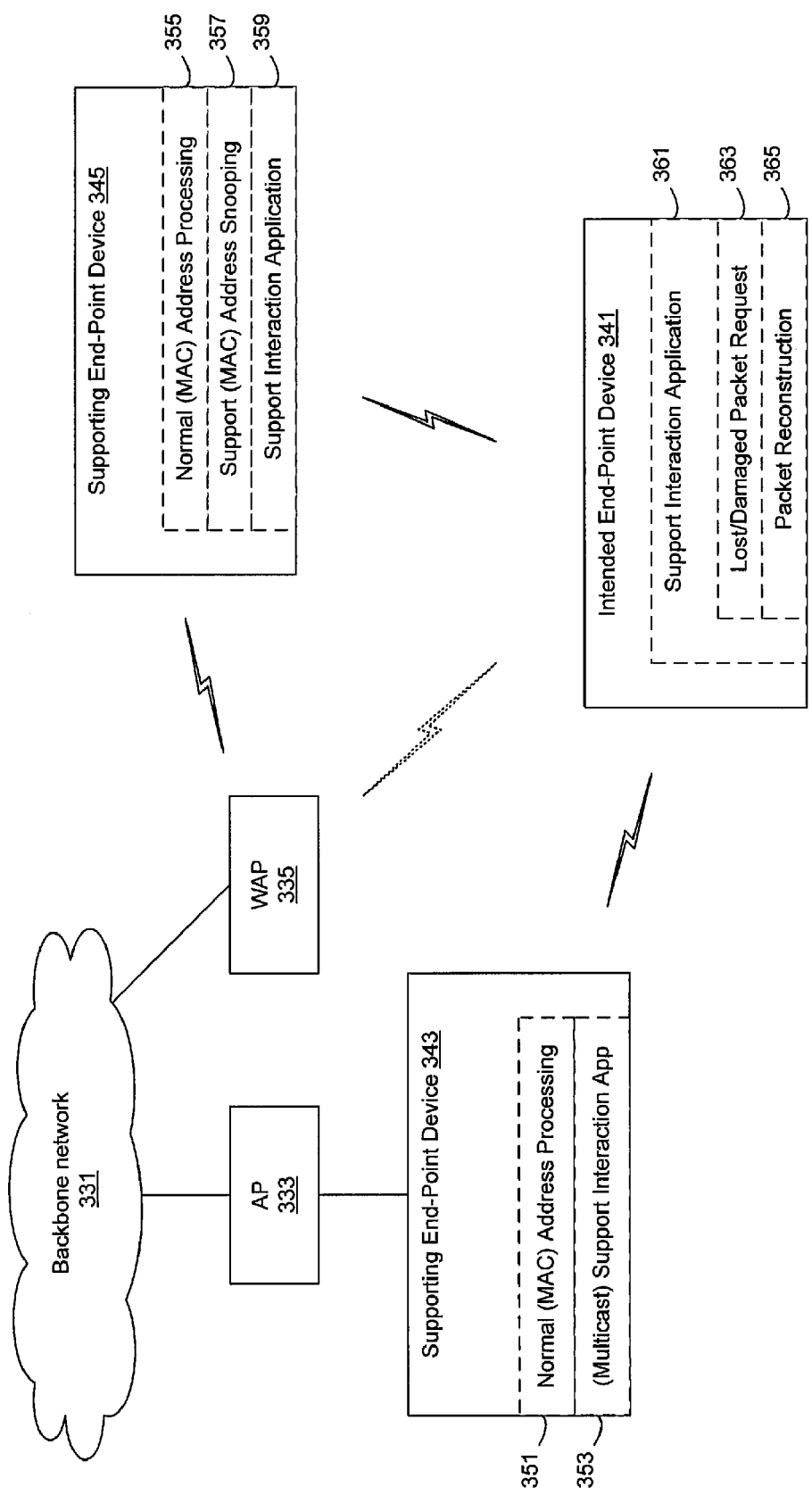
FIG. 3B is a block diagram that illustrates an exemplary setup of a plurality of end-point devices that are operable to enable ad-hoc network pathway support, in accordance with an embodiment of the invention.

FIG. 3B is a block diagram that illustrates an exemplary setup of a plurality of end-point devices that are operable to enable ad-hoc network pathway support, in accordance with an embodiment of the invention. Referring to FIG. 3B, there is shown backbone network 331, an access point (AP) 333, a wireless access point (WAP) 335, an intended end-point device 341, and supporting end-point devices 343 and 345.

The backbone network 331 comprises suitable hardware, logic, circuitry, and/or code operable to provide overall system connectivity among local and/or remote devices, systems, and/or sub-networks. The backbone network 116 is enabled to interact with, and connect different wired and/or wireless interfaces. The backbone network 331 corresponds to, for example, one or more the communication networks 111.

The AP 333 comprises hardware, logic, circuitry, and/or code operable to enable network connectivity into the backbone 331, based on one or more communication interfaces. The WAP 335 is substantially similar to the AP 333; however, the WAP 335 is operable to enable wireless connectivity based on one or more wireless interfaces. The intended end-point device 341 comprises a user end-point device that is operable to be serviced via ad-hoc network pathway support. The intended end-point device 341 is substantially similar to, for example, the user end-point device 121, 125, or 129 as described in FIG. 1. Each of the supporting end-point devices 343 and 345 comprises a communicative device that is operable to provide ad-hoc network pathway support. Each of the supporting end-point devices 343 and 345 is substantially similar to, for example, the user end-point device 123 or 127, or the private AP servicing device 131, as described in FIG. 1

In operation, in instances where the intended end-point device 341 is not able to receive any direct network access and/or when the direct network access of the intended device 341 is deemed insufficient, the supporting end-point devices 343 and/or 345 are operable to provide ad-hoc network pathway support to enable network connectivity in the intended end-point device 341, substantially as described with respect to FIG. 1. In an exemplary aspect of the invention, the intended end-point device 341 and the supporting end-point devices 343 and 345 are operable to utilize MAC based addressing to perform necessary interactions during ad-hoc network pathway support. To enable ad-hoc network pathway support, the supporting end-point devices 343 and/or 345 is operable service a plurality of MAC addresses, wherein at least one address corresponds to network traffic is exclusively intended for the supporting end-point device and at least one address corresponds to network traffic intended for serviced end-point devices. Alternatively, the supporting end-point devices 343 and/or 345 is operable to only receive network traffic corresponding to their MAC address, and then MAC address substitution is then performed on network traffic that is determined to be intended for serviced end-point devices.

The supporting end-point device 343 is operable, for example, to provide ad-hoc network pathway support wherein the intended end-point device 343 is enabled to receive network traffic via multicast communication. The network traffic is broadcast, for example, via the backbone 331 and the AP 333, to the supporting end-point device 343. The normal MAC address processing function 351 in the supporting end-point device 343 is operable to perform necessary MAC based processing to receive network traffic based on supported MAC addresses. The multicast support interaction application 353 is operable, in the supporting end-point device 343, to enable communicating the network traffic determined to be intended for the intended end-point device 341. Where device communicate via 802.11 connections, for example, the multicast support interaction application 353 is operable to construct 802.11 packets, substantially similar to the 802.11 packet 300 as described in FIG. 3A, wherein the PHY preamble 301, the PHY header 303, the MAC header 305 and/or the MAC footer 307 are generated and/or updated to enable reception of the packets in the intended end-point device 341.

The supporting end-point device 345 is operable, for example, to provide ad-hoc network pathway support wherein the intended end-point device 341 is enabled to utilize snoop communication. Network traffic, communicated, for example, via the backbone 331 and the AP 333, is received via supporting end-point device 345. The normal MAC address processing function 355 in the supporting end-point device 345 is operable to perform necessary MAC based processing to receive the network traffic based on supported MAC addresses. The support MAC address snooping function 357 in the supporting end-point device 345 is operable to perform necessary MAC based processing operation to enable snooping by the intended end-point device 341. For example, the support MAC address snooping function 357 is operable to determine as subset of MAC addresses that the intended end-point device 341 is authorized to snoop for and/or to perform MAC address substitution to cause a match based on predetermined snoop criteria. The support interaction application 359 is operable to enable communicating the network traffic determined to be intended for the intended end-point device 341.

The intended end-point device 341 is operable to communicate with the supporting end-point devices 343 and/or 345 to setup serviceability via ad-hoc network pathway support wherein the intended end-point device 341 is enabled to utilize snoop communication. The support interaction application 361 is operable to enable receiving the network traffic intended for the intended end-point device 341, and communicated via the supporting end-point devices 343 and/or 345. The intended end-point device 341 is also operable to determine via the lost/damaged packet request function 363 when expected network traffic packets are not received and/or are received damaged. The lost/damaged packet request function 363 is then operable to request, via the supporting end-point devices 343 and/or 345, replacement network traffic for damaged and/or lost packets. In an exemplary aspect of the invention, a serviced end-point device is operable to reconstruct traffic data based on packets received from a plurality of servicing devices. For example, the intended end-point device 341 is operable to receive network traffic directly, and via both supporting end-point devices 343 and 345 simultaneously. The intended end-point device 341 and the supporting end-point device 343 and 345 devices are operable to receive network traffic via different paths. When the same network packets are transmitted to all three devices simultaneously, during multicast communication for example, damage and/or corruption that may affect communication of the packets would likely affect the packets received via the devices differently due to time and/or spatial diversity of data communication via the devices, thus causing corruption in different parts of the payloads of the packets. Therefore, the same packet, when communicated to all three devices would likely comprise differing corrupt and uncorrupted parts. Consequently, the intended end-point device 341 is operable to attempt to reconstruct desired traffic, via the packet reconstruction function 365, from all received packets, utilizing non-corrupt and/or damaged parts of the packets.

The supporting end-point devices 343 and/or 345 need not process the network traffic intended for the end-point device 341 beyond processing PHY and/or MAC headers to determine routing and/or addressing information. Therefore, security of communication via the intended end-point device 341 is not compromised even though no additional encryption/decryption operations are performed during snoop or multicast packets communication between the intended end-point device 341 and the supporting end-point devices 343 and/or 345.

Figure 4:
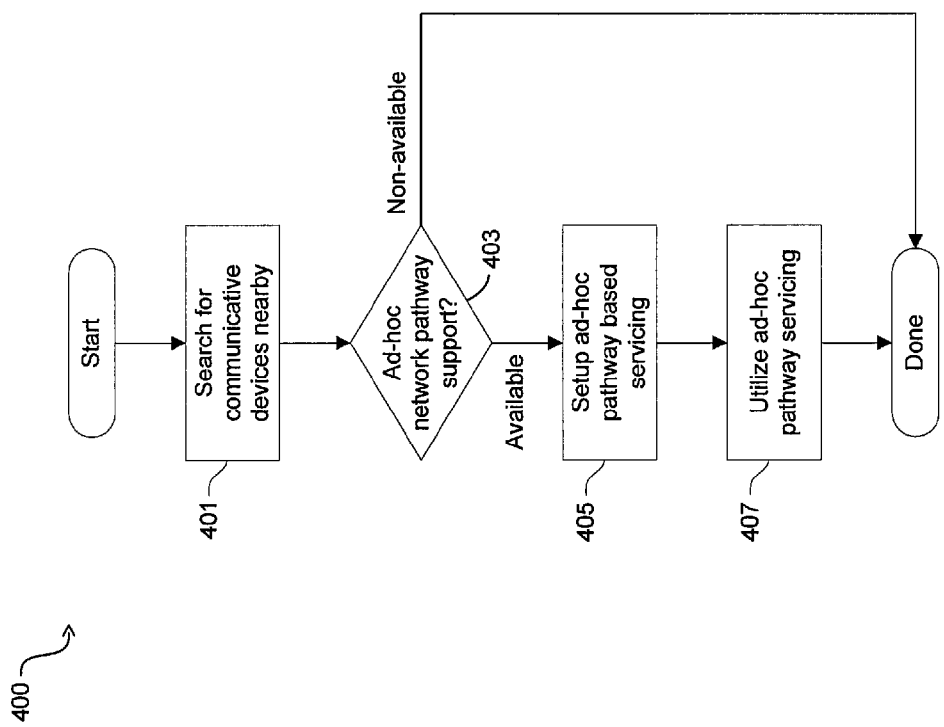
FIG. 4 is a flow chart that illustrates communication devices providing ad-hoc pathway servicing in user end-point devices, in accordance with an embodiment of the invention.

FIG. 4 is a flow chart that illustrates communicative devices providing ad-hoc pathway servicing in user end-point devices, in accordance with an embodiment of the invention. Referring to FIG. 4, there is shown a flow chart 400 comprising a plurality of exemplary steps, which may enable ad-hoc network pathway support.

In step 401, a user end-point device searches for nearby communication devices that is operable to provide ad-hoc network pathway support. For example, the user end-point devices 121, 125 and/or 129 search for, and discover the presence of the user end-point devices 123 and/or 127, and/or the private AP servicing device 131. The exemplary steps then proceed to step 403.

In step 403, the user end-point device determines whether ad-hoc network pathway support is available via discovered communicative devices. For example, once the user end-point device 125 discovers presence of the user end-point device 127 and the private AP servicing device 131 in its operational proximity, the user end-point device 125 is operable to communicate with these devices to determine whether they are operable to provide ad-hoc network pathway support. In instances where ad-hoc network pathway support is unavailable, the exemplary steps terminate.

Returning to step 403, in instances where ad-hoc network pathway support is available, the exemplary steps proceed to step 405. In step 405, ad-hoc network pathway support based servicing is setup between the servicing devices and the serviced user end-point device. For example, once the user end-point device 125 determines that the user end-point device 127 and/or the private AP servicing device 131 are operable to provide ad-hoc network pathway support, the devices communicate to determine available services. The devices may determine type of communication available via provided ad-hoc network pathway support, for example whether to enable snoop and/or multicast communication. The devices may also negotiate and setup service parameters based on, for example, incentives to servicing and serviced device.

In step 407, the serviced user end-point device is serviced via available ad-hoc network pathway support. For example, the intended end-point device 341 is serviced via the supporting end-point devices 343 and/or 345, utilizing snoop and/or multicast communication.

Various embodiments of the invention may comprise a method and system for utilizing ad-hoc network pathway support via communication devices. The user end-point devices 121, 125, and/or 129 are operable to determine when the user end-point devices 123, 127, and/or the personal AP servicing device 131 are operable to provide ad-hoc network pathway support servicing. The user end-point devices 121, 125, and/or 129 are operable to negotiate with the servicing devices for incentives for facilitating ad-hoc network communication via one or more connections that are established between devices. The offering and/or requesting of services via ad-hoc network pathway support is incentivized to the servicing devices and/or to the serviced devices. The servicing and serviced devices are operable to negotiate parameters of services provided via ad-hoc network pathway support. The servicing devices are operable to request and/or receive pay and/or credit for providing ad-hoc network pathway support, and/or the serviced devices are operable to allow billing, debiting and/or payment form services received via ad-hoc network pathway support. Various types of communication between servicing and serviced devices during ad-hoc network pathway support. Multicast communication is utilized, for example, to communicate traffic, intended for the user end-point device 125, to the user end-point device, and to the user end-point device 127 and/or the private AP servicing device 131. Snoop communication is utilized, for example, to enable the user end-point device 129 to snoop to the user end-point device 127 to determine traffic that is intended for and/or sought by the user end-point device 129. Support of multicast and/or snoop communication is enabled based on, for example, MAC addressing and/or routing in the servicing devices and/or the serviced devices.

The user end-point device 123 and/or 127, and/or the private AP servicing device 131 are operable to manage services provided via ad-hoc network pathway support provided via these devices. This management comprises, for example, providing access to, blocking, limiting and/or modifying one or more of the provided services. The service management is based on a plurality of resources available to and/or incentives provided to the user end-point device 123 and/or 127, and/or the private AP servicing device 131. The plurality of resources relevant to the service management comprises processing capability, available memory, available bandwidth, and/or processing bandwidth. The user end-point devices 121, 125, and/or 129, and the user end-point device 123 and/or 127, and/or the private AP servicing device 131 are operable to negotiate parameters of services available via ad-hoc network pathway support. The intended user end-point device 341 is operable to reconstruct data and/or messaging that is intended for the devices utilizing a plurality of packets received directly via the intended user end-point device 341 and via the supporting user end-point devices 343 and/or 345. During reconstruction operations, undamaged portions of the received packets are utilized to facilitated the reconstructing of the sought data and/or messages.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing ad-hoc network pathway support via communication devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   determining, via a user end-point device, a plurality of personal communication devices that are operable to communicate with said user end-point device;
   establishing, via said user end-point device, one or more connections with said plurality of personal communication devices to enable ad-hoc network communication via said one or more communication devices; and
   negotiating with said personal communication devices, incentives for engaging in and/or facilitating said ad-hoc network communication via said one or more connections, wherein:
      said incentives are negotiated based on one or more connectivity and/or service related parameters associated with said one or more connections; and
      said negotiation comprises requesting adjustment of at least one of said connectivity and/or service related parameters based on adjustment of said incentives.

2. The method according to claim 1, wherein said personal communication devices store, buffer and/or queue data and/or messaging communicated to and/or from said user end-point device.

3. The method according to claim 1, wherein said ad-hoc network communication enables utilizing multicasting communication, wherein data and/or messages communicated to said user-end point device are also communicated to at least some of said personal communication devices to enable retrieval of said data and/or messaging from said personal communication devices by said user end-point device.

4. The method according to claim 3, wherein said multicasting communication is setup, managed, and/or controlled via one or more resource servers and/or via one or more nodes in paths between said user end-point device and said one or more resource servers.

5. The method according to claim 1, wherein said ad-hoc network communication enables utilizing traffic snooping, wherein messaging and/or data intended for said user end-point device is detected and/or forwarded via at least some of said personal communication devices.

6. The method according to claim 5, comprising utilizing MAC address snooping via said user end-point device to perform said traffic snooping.

7. The method according to claim 1, wherein said ad-hoc network communication is managed via said user end-point device and/or one or more of said personal communication devices based on network accessibility, bandwidth, suitable serviceability, and/or access to data and/or storage available via said personal communication devices.

8. The method according to claim 1, wherein said incentives to said personal communication devices comprise receiving compensation and/or credit for providing said services.

9. The method according to claim 1, wherein one or more group support servers are utilized to support and/or manage said ad-hoc network communication.

10. The method according to claim 1, comprising reconstructing data and/or messaging in said user end-point device based a plurality of packets received directly in said user end-point device and/or via at least some of said personal communication devices.

11. A system for networking, the system comprising:
one or more circuits for use in a user end-point device, said one or more circuits are operable to determine a plurality of personal communication devices that are operable to communicate with said user end-point device;
said one or more circuits are operable to establish, via said user end-point device, one or more connections with said plurality of personal communication devices to enable ad-hoc network communication via said one or more communication devices; and
said one or more circuits are operable to negotiate with said personal communication devices, incentives for engaging in and/or facilitating said ad-hoc network communication via said one or more connections, wherein:
said incentives are negotiated based on one or more connectivity and/or service related parameters associated with said one or more connections; and
said negotiation comprises requesting adjustment of at least one of said connectivity and/or service related parameters based on adjustment of said incentives.

12. The system according to claim 11, wherein said personal communication devices store, buffer and/or queue data and/or messaging communicated to and/or from said user end-point device.

13. The system according to claim 11, wherein said ad-hoc network communication enables utilizing multicasting communication, wherein data and/or messages communicated to said user-end point device are also communicated to at least some of said personal communication devices to enable retrieval of said data and/or messaging from said personal communication devices by said user end-point device.

14. The system according to claim 13, wherein said multicasting communication is setup, managed, and/or controlled via one or more resource servers and/or via one or more nodes in paths between said user end-point device and said one or more resource servers.

15. The system according to claim 11, wherein said ad-hoc network communication enables utilizing traffic snooping, wherein messaging and/or data intended for said user end-point device is detected and/or forwarded via at least some of said personal communication devices.

16. The system according to claim 15, wherein said one or more circuits are operable to utilize MAC address snooping via said user end-point device to perform said traffic snooping.

17. The system according to claim 11, wherein said ad-hoc network communication is managed via said user end-point device and/or one or more of said personal communication devices based on network accessibility, bandwidth, suitable serviceability, and/or access to data and/or storage available via said personal communication devices.

18. The system according to claim 11, wherein said incentives to said personal communication devices comprise receiving compensation and/or credit for providing said services.

19. The system according to claim 11, wherein one or more group support servers are utilized to support and/or manage said ad-hoc network communication.

20. The system according to claim 11, wherein said one or more circuits are operable to reconstruct data and/or messaging in said user end-point device based a plurality of packets received directly in said user end-point device and/or via at least some of said personal communication devices.

21. A system, comprising:
one or more circuits for use in a server that manages ad-hoc connectivity, said one or more circuits being operable to maintain user accounts associated a plurality of users;
said one or more circuits are operable to control ad-hoc connectivity among a plurality of communication devices, wherein at least one of said plurality of communication device is associated with a particular one of said plurality of users; and
said one or more circuits are operable to adjust at least one of said user accounts based on requests for credit or billing adjustments received from at least one of said plurality of communication devices, wherein said requests are based on incentive negotiations during ad hoc communications via one or more of said plurality of communication devices.

22. The system according to claim 21, wherein said one or more circuits are operable to authenticate users attempting to access an ad-hoc network managed by said server.

* * * * *